US009055556B2

(12) United States Patent
Wietfeldt et al.

(10) Patent No.: US 9,055,556 B2
(45) Date of Patent: Jun. 9, 2015

(54) METHOD AND APPARATUS FOR SELECTING RADIOS AND MAPPING APPLICATIONS TO RADIOS ON A WIRELESS DEVICE

(75) Inventors: Richard D. Wietfeldt, San Diego, CA (US); George Chrisikos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 13/074,913

(22) Filed: Mar. 29, 2011

(65) Prior Publication Data

US 2012/0077506 A1 Mar. 29, 2012

Related U.S. Application Data

(60) Provisional application No. 61/320,035, filed on Apr. 1, 2010, provisional application No. 61/320,041, filed on Apr. 1, 2010.

(51) Int. Cl.
*H04W 36/00* (2009.01)
*H04W 72/02* (2009.01)
(Continued)

(52) U.S. Cl.
CPC .............. *H04W 72/02* (2013.01); *H04W 48/18* (2013.01); *H04W 72/048* (2013.01); *H04W 72/085* (2013.01); *H04W 72/087* (2013.01); *H04W 88/06* (2013.01)

(58) Field of Classification Search
CPC ..... H04W 36/00; H04W 36/14; H04W 36/24; H04W 36/34
USPC ................. 370/338, 328, 342, 350, 468, 229; 455/448, 450, 440, 509, 512, 452.2, 455/426.1, 63.1, 501
See application file for complete search history.

(56) References Cited

U.S. PATENT DOCUMENTS 6,122,514 A * 9/2000 Spaur et al. .................... 455/448
6,785,227 B1 * 8/2004 Lu et al. ......................... 370/229
(Continued)

FOREIGN PATENT DOCUMENTS

CN 1716900 A 1/2006
CN 101072432 A 11/2007
(Continued)

OTHER PUBLICATIONS

Aguiar J T et al., "A framework for the evaluation of converged mobile and wireless communication systems", Personal, Indoor and Mobile Radio Communications, 2004, PIMRC 2004, 15 th IEEE International Symposium on Barcelona, Spain Sep. 5-8, 2004, Piscataway, NJ, USA, IEEE.
(Continued)

*Primary Examiner* — David Q Nguyen
(74) *Attorney, Agent, or Firm* — Rupit M. Patel

(57) ABSTRACT

Techniques for selecting radios and mapping applications to radios on a wireless device are described. The wireless network may have at least one application that is active and a plurality of radios that are available for use. In one design, the wireless device determines requirements of the at least one application, which may be related to throughput, latency, jitter, etc. The wireless device selects at least one radio among the plurality of radios based on the requirements of the at least one application and possibly other factors. The wireless device determines a mapping of the at least one application to the at least one radio based on the requirements of the at least one application, the performance of the at least one radio, and/or other factors. The wireless device maps the at least one application to the at least one radio based on the mapping.

28 Claims, 11 Drawing Sheets

(51) Int. Cl.
*H04W 48/18* (2009.01)
*H04W 72/04* (2009.01)
*H04W 72/08* (2009.01)
*H04W 88/06* (2009.01)

(56) References Cited

U.S. PATENT DOCUMENTS

| | | | |
|---|---|---|---|
| 7,065,367 B2 * | 6/2006 | Michaelis et al. | 455/452.2 |
| 7,146,133 B2 * | 12/2006 | Bahl et al. | 455/63.1 |
| 7,280,506 B2 * | 10/2007 | Lin et al. | 370/331 |
| 7,539,175 B2 * | 5/2009 | White et al. | 370/350 |
| 7,623,879 B2 * | 11/2009 | Honkanen et al. | 455/501 |
| 7,899,396 B2 | 3/2011 | Meylan et al. | |
| 2005/0239497 A1 | 10/2005 | Bahl et al. | |
| 2006/0209821 A1 | 9/2006 | Jung et al. | |
| 2008/0019339 A1 * | 1/2008 | Raju et al. | 370/338 |
| 2009/0180451 A1 * | 7/2009 | Alpert et al. | 370/338 |
| 2010/0075665 A1 * | 3/2010 | Nader et al. | 455/426.1 |
| 2012/0077505 A1 | 3/2012 | Wietfeldt et al. | |

FOREIGN PATENT DOCUMENTS

| | | |
|---|---|---|
| EP | 1589781 | 10/2005 |
| JP | 2001507895 A | 6/2001 |
| JP | 2001507895 A | 6/2001 |
| JP | 2007529127 A | 10/2007 |
| JP | 2008306665 A | 12/2008 |
| JP | 2008311745 A | 12/2008 |
| JP | 2009509372 A | 3/2009 |
| JP | 2009512245 A | 3/2009 |
| WO | WO9829975 A2 | 7/1998 |
| WO | WO-9829975 A2 | 7/1998 |
| WO | WO-2004008793 A1 | 1/2004 |
| WO | WO2004008793 A1 | 1/2004 |
| WO | WO-2005055524 A1 | 6/2005 |
| WO | WO2006055784 A2 | 5/2006 |
| WO | WO-2006055784 A2 | 5/2006 |
| WO | WO-2007033955 A1 | 3/2007 |
| WO | WO-2007036687 | 5/2007 |
| WO | WO-2007143352 A1 | 12/2007 |

OTHER PUBLICATIONS

Piscataway, NJ, USA, vol. 2, Sep. 5, 2004, pp. 752-756, XP010754132, DOI:10.1109/PlMRC.2004.1373801, ISBN: 978-0-7803-8523-8.

Ferreira L et al., "Simultaneous Use in Mobile Communications", 2005 IEEE 61st Vehicular Technology Conference. VTC2005-Spring—May 30-June 1, 2005—Stockholm, Sweden, IEEE, Piscataway, NJ, USA, vol. 3, May 30, 2005, pp. 1468-1472, XP010855666, DOI:10.1109/VETECS.2005.1543563 ISBN: 978-0-7803-8887-1.

International Search Report and Written Opinion—PCT/US2011/031026,ISA/EPO—Jun. 20, 2011.

Aguiar J T et al., "A framework for the evaluation of converged mobile and wireless communication systems", Personal, Indoor and Mobile Radio Communications, 2004, PIMRC 2004, 15 th IEEE International Symposium on Barcelona, Spain Sep. 5-8, 2004, Piscataway, NJ, USA, IEEE, Piscataway, NJ, USA, vol. 2, Sep. 5, 2004, pp. 752-756, XP010754132, DOI:10.1109/PIMRC.2004.1373801, ISBN: 978-0-7803-8523-8.

Ferreira L et al., "Simultaneous Use in Mobile Communications", 2005 IEEE 61st Vehicular Technology Conference. VTC2005-Spring—May 30-Jun. 1, 2005—Stockholm, Sweden, IEEE, Piscataway, NJ, USA, vol. 3, May 30, 2005, pp. 1468-1472, XP010855666, DOI:10.1109/VETECS.2005.154363 ISBN: 978-0-7803-8887-1.

International Search Report and Written Opinion—PCT/US2011/031024, ISA/EPO—Jun. 28, 2011.

International Search Report and Written Opinion—PCT/US2011/031026, ISA/EPO—Jun. 20, 2011.

Taiwan Search Report—TW100111681—TIPO—Dec. 4, 2013.

* cited by examiner

METHOD AND APPARATUS FOR SELECTING RADIOS AND MAPPING APPLICATIONS TO RADIOS ON A WIRELESS DEVICE

The present application claims priority to provisional U.S. Application Ser. No. 61/320,035, entitled "METHOD AND APPARATUS FOR FRACTIONAL SYSTEM SELECTION IN A WIRELESS SYSTEM," and provisional U.S. Application Ser. No. 61/320,041, entitled "METHOD AND APPARATUS FOR CONNECTION MANAGER/COEXISTENCE MANAGER INTERACTION IN A WIRELESS SYSTEM," both filed Apr. 1, 2010, assigned to the assignee hereof, and incorporated herein by reference.

BACKGROUND

I. Field

The present disclosure relates generally to communication, and more specifically to techniques for supporting communication by a wireless communication device.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication device may include a number of radios to support communication with different wireless communication networks. The wireless device may also support a number of applications, which may have different requirements. It may be desirable to support communication for active applications on the wireless device such that good performance can be achieved.

SUMMARY

Techniques for selecting radios and mapping applications to radios on a wireless device are described herein. The wireless device may have at least one application that is active and a plurality of radios that are available for use. Each radio may support a particular radio technology and may be a transmitter or a receiver. The wireless device may select at least one radio for use by taking into account requirements of the at least one application. The wireless device may map the at least one application to the at least one radio such that good performance can be achieved.

In one design, the wireless device may determine requirements of at least one application active on the wireless device. The requirements of the at least one application may be related to throughput, latency, jitter, connection time, call drop rate, etc. The wireless device may select at least one radio among a plurality of radios on the wireless device based on the requirements of the at least one application, radio preferences of the at least one application, priorities of the available radios, performance of the radios, interference between the radios, impact on one or more wireless networks, etc.

In one design, the wireless device may determine a mapping of the at least one application to the at least one radio based on the requirements of the at least one application, the performance of the at least one radio, and/or other factors. The wireless device may map the at least one application to the at least one radio based on the mapping. The wireless device may iteratively select at least one radio and determine the mapping for a plurality of iterations to improve performance.

In one design, the wireless device may determine the performance of the at least one radio based on at least one metric related to interference between the available radios. The wireless device may set an operating state of each of the at least one radio based on the requirements of the at least one application and/or the interference between the radios. In one design, the wireless device may dynamically/adaptively modify the requirements of the at least one application based on the performance of the at least one radio.

Various aspects and features of the disclosure are described in further detail below.

DETAILED DESCRIPTION

Figure 1:
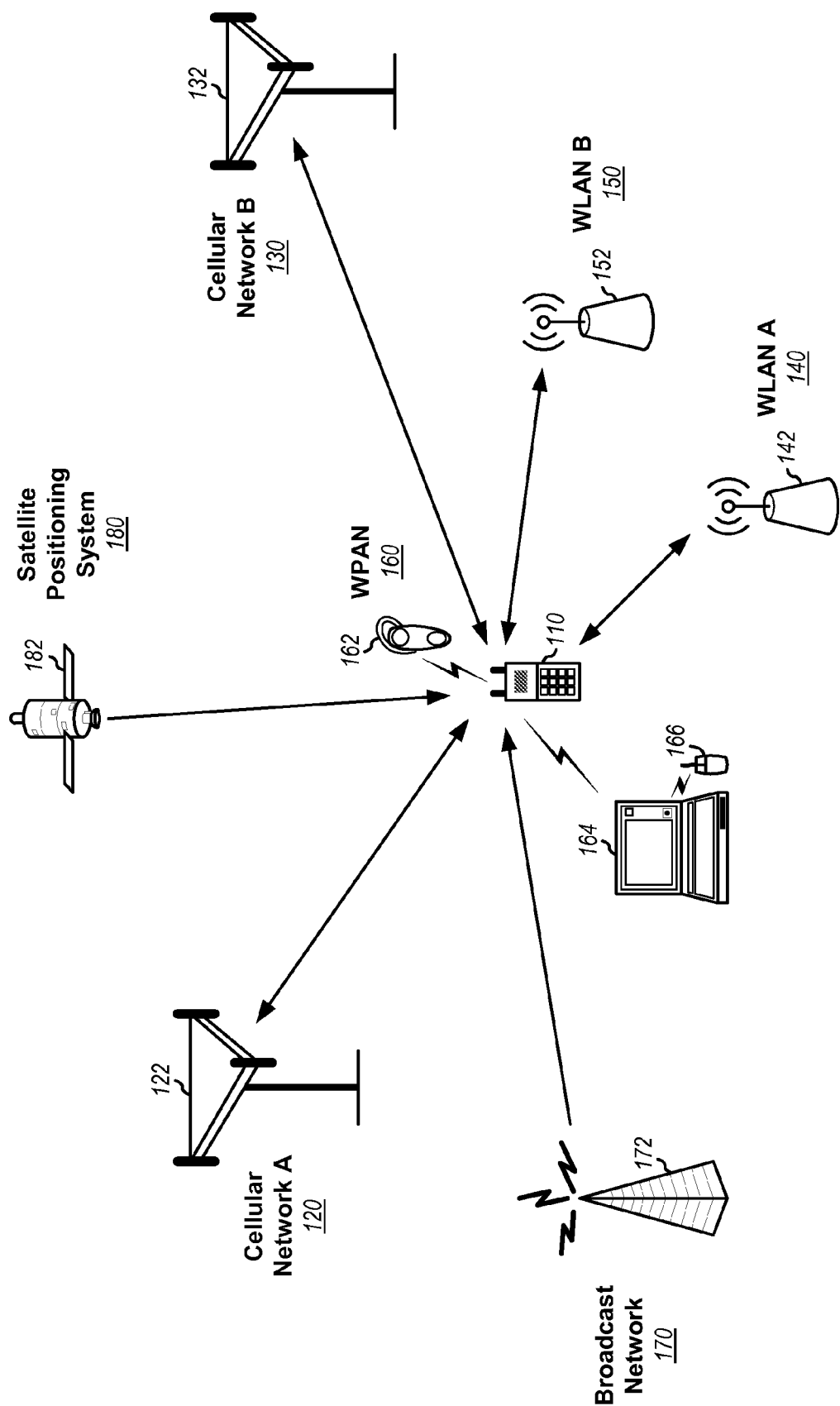
FIG. 1 shows a wireless device communicating with various wireless networks.

FIG. 1 shows a wireless communication device 110 capable of communicating with multiple wireless communication networks. These wireless networks may include one or more wireless wide area networks (WWANs) 120 and 130, one or more wireless local area networks (WLANs) 140 and 150, one or more wireless personal area networks (WPANs) 160, one or more broadcast networks 170, one or more satellite positioning systems 180, other networks and systems not shown in FIG. 1, or any combination thereof. The terms "network" and "system" are often used interchangeably. The WWANs may be cellular networks.

Cellular networks 120 and 130 may each be a CDMA network, a TDMA network, a FDMA network, an OFDMA network, a SC-FDMA network, or some other network. A CDMA network may implement a radio technology or air interface such as Universal Terrestrial Radio Access (UTRA), cdma2000, etc. UTRA includes Wideband CDMA (WCDMA) and other variants of CDMA. cdma2000 covers IS-2000, IS-95, and IS-856 standards. IS-2000 is also referred to as CDMA 1x, and IS-856 is also referred to as Evolution-Data Optimized (EVDO). A TDMA network may implement a radio technology such as Global System for Mobile Communications (GSM), Digital Advanced Mobile Phone System (D-AMPS), etc. An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). Cellular networks 120 and 130 may include base stations 122 and 132, respectively, which can support bi-directional communication for wireless devices.

WLANs 140 and 150 may each implement a radio technology such as IEEE 802.11 (Wi-Fi), Hiperlan, etc. WLANs 140 and 150 may include access points 142 and 152, respectively, which can support bi-directional communication for wireless devices. WPAN 160 may implement a radio technology such as Bluetooth (BT), IEEE 802.15, etc. WPAN 160 may support bi-directional communication for various devices such as wireless device 110, a headset 162, a computer 164, a mouse 166, etc.

Broadcast network 170 may be a television (TV) broadcast network, a frequency modulation (FM) broadcast network, a digital broadcast network, etc. A digital broadcast network may implement a radio technology such as MediaFLO™, Digital Video Broadcasting for Handhelds (DVB-H), Integrated Services Digital Broadcasting for Terrestrial Television Broadcasting (ISDB-T), Advanced Television Systems Committee-Mobile/Handheld (ATSC-M/H), etc. Broadcast network 170 may include one or more broadcast stations 172 that can support one-way communication.

Satellite positioning system 180 may be the United States Global Positioning System (GPS), the European Galileo system, the Russian GLONASS system, the Japanese Quasi-Zenith Satellite System (QZSS), the Indian Regional Navigational Satellite System (IRNSS), the Chinese Beidou system, etc. Satellite positioning system 180 may include a number of satellites 182 that transmit signals used for positioning.

Wireless device 110 may be stationary or mobile and may also be referred to as a user equipment (UE), a mobile station, a mobile equipment, a terminal, an access terminal, a subscriber unit, a station, etc. Wireless device 110 may be a cellular phone, a personal digital assistant (PDA), a wireless modem, a handheld device, a laptop computer, a cordless phone, a wireless local loop (WLL) station, a smart phone, a netbook, a smartbook, a tablet, a broadcast receiver, etc. Wireless device 110 may communicate two-way with cellular networks 120 and/or 130, WLANs 140 and/or 150, devices within WPAN 160, etc. Wireless device 110 may also receive signals from broadcast network 170, satellite positioning system 180, etc. In general, wireless device 110 may communicate with any number of wireless networks and systems at any given moment.

Figure 2:
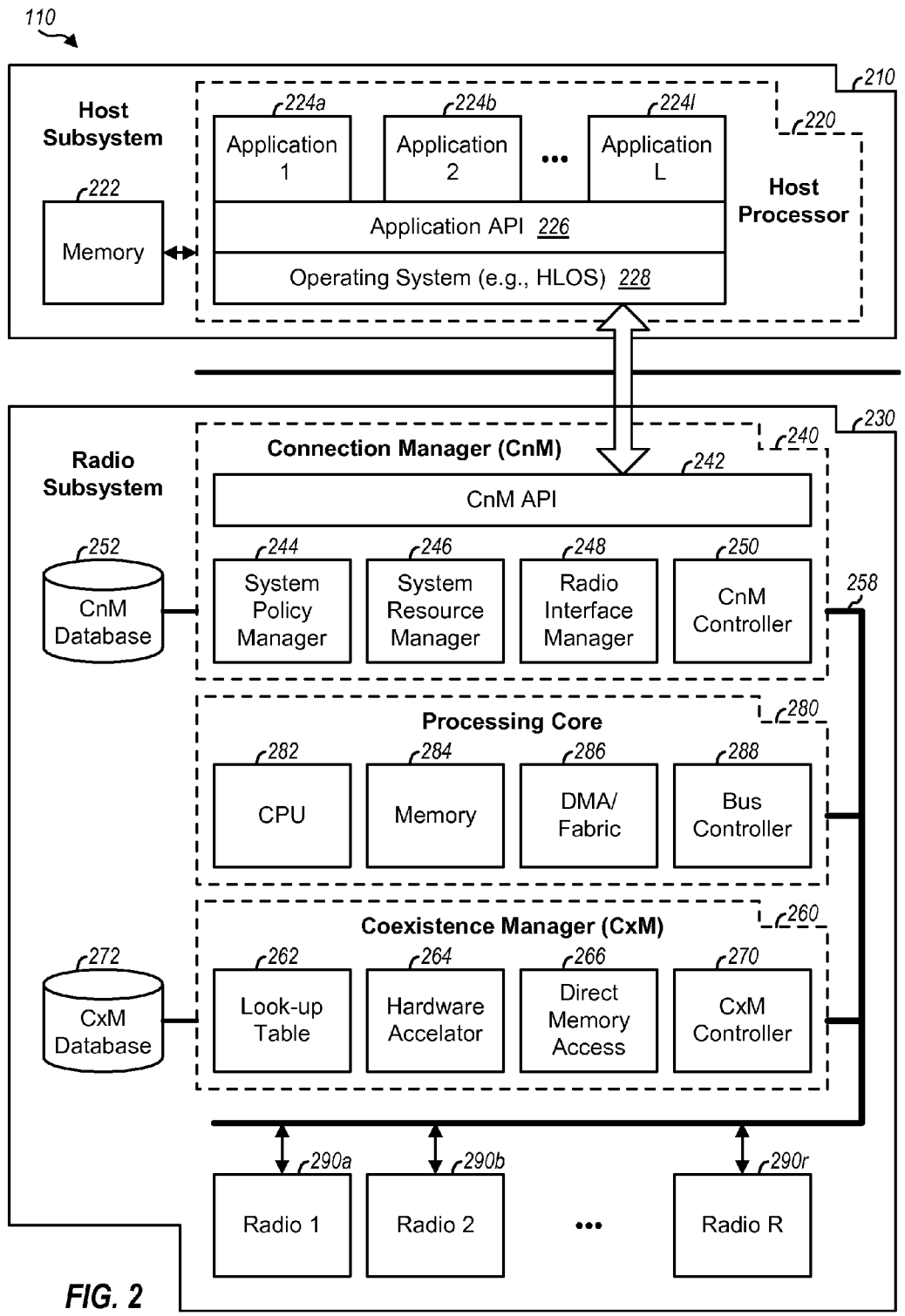
FIG. 2 shows a block diagram of the wireless device.

FIG. 2 shows a block diagram of a design of wireless device 110, which includes a host subsystem 210 and a radio subsystem 230. In the design shown in FIG. 2, host subsystem 210 includes a host processor 220 and a memory 222. Wireless device 110 may support L applications 224a through 224l, which may provide different communication services such as voice, packet data, video share, video telephony, email, broadcast reception, instant messaging, push-to-talk, etc. In general, L may be any value. Any one of the L applications 224 may be active at any given moment. An application programming interface (API) 226 may support communication between applications 224 and an operating system (OS) 228 for wireless device 110. Operating system 228 may control the operation of wireless device 110 and may be a high level operating system (HLOS) or some other operating system. Host processor 220 may execute the active applications and may also run the API and the operating system. Memory 222 may store program codes and data for host processor 220.

In the design shown in FIG. 2, radio subsystem 230 includes a connection manager (CnM) 240, a coexistence manager (CxM) 260, a processing core 280, a CnM database 252, a CxM database 272, and R radios 290a through 290r, where R may be any value. Radio subsystem 230 may be a modem chip, a modem chipset, a wireless data card, etc. The R radios 290 may be for 3GPP2 cellular networks (e.g., CDMA 1x, EVDO, etc.), 3GPP cellular networks (e.g., GSM, GPRS, EDGE, WCDMA/UMTS, LTE, etc.), WLANs, WiMAX networks, GPS, Bluetooth, broadcast networks, etc.

Connection manager 240 may perform various functions to support communication for active applications via available radios. Within connection manager 240, a CnM API 242 may facilitate communication between connection manager 240 and coexistence manager 260 and applications 224. A system policy manager 244 may manage policies associated with the radios, activate and de-activate radios in response to events, and manage handoffs between wireless networks. The policies may be used to determine which radio(s) to use for any given application. System policy manager 244 may operate based on network operator rules, which may be provided via a preferred roaming list (PRL) in 3GPP2, a list of preferred public land mobile networks (PLMNs) in 3GPP, etc. A system resource manager 246 may interface with system policy manager 244 to perform resource management such as conflict resolution, power management, link quality-of-service (QoS), admission control, etc. A radio interface manager 248 may manage call, manage service continuity, change phone settings, register/de-register supplementary services, and notify applications regarding call status, phone state/status, and service status. Radio interface manager 248 may also support peer-to-peer communication between wireless device 110 and other wireless devices. A CnM controller 250 may be responsible for the overall control of connection manager 240. CnM controller 250 may communicate with applications 224 via CnM APIs to determine which applications are active, obtain the requirements of the active applications, and receive information for the available and/or selected radios. CnM controller 250 may also coordinate the operation of other managers and controllers within connection manager 240.

Coexistence manager 260 may interface with radios 290 and may control the operation of the radios. Coexistence manager 260 may receive inputs from radios 290 and may also receive requirements of active applications from connection manager 240. Coexistence manager 260 may control the operation of the active radios to mitigate interference between these radios and achieve good performance for as many radios as possible. Within coexistence manager 260, a CxM controller 270 may be responsible for the overall control of coexistence manager 260. A look-up table (LUT) 262 may be associated with (and interface with) CxM database 272 to retrieve pertinent parts of the database based on the current operating scenario. A hardware accelerator (HWA) 264 may provide efficient processing of certain functions and may use a direct memory access (DMA) module 266 to directly access a memory store.

Processor core 280 may perform processing for the units within radio subsystem 230. Within processing core 280, a central processing unit (CPU) 282 may perform processing as requested by connection manager 240 and coexistence manager 260. CPU 282 may also perform processing (e.g., encoding, decoding, modulation, demodulation, encryption, decryption, etc.) for data being transmitted or received via radios 290. Memory 284 may store program code and data for connection manager 240 and coexistence manager 260. A DMA/fabric controller 286 may support data transfer with local or external system memory or other subsystems. A bus controller 288 may coordinate communication via a data bus 258, which may interconnect the various modules within radio subsystem 230.

CxM database 272 may store an interference database, which may comprise information on performance of different combinations of radios in different operating scenarios. The operation of radios may be controlled based on the interference database to obtain good or acceptable performance for the radios.

CnM database 252 may store various types of information that may be used to select radios for applications. For example, CnM database 252 may store (i) a profile database of profiles that may be used to obtain connectivity, (ii) a network database of information for different wireless networks (e.g., a PRL, a preferred PLMN list, etc.), (iii) a policy database of information used to select radios to provide connectivity for wireless device 110, (iv) a converted interference database of information used to select radios for applications based on the current operating scenario, and/or (v) other databases of other information for wireless device 110.

FIG. 2 shows an exemplary design of radio subsystem 230, connection manager 240, coexistence manager 260, and processing core 280 for wireless device 110. Radio subsystem 230, connection manager 240, coexistence manager 260, and processing core 280 may also include fewer, different, and/or additional managers, controllers, and databases. In general, radio subsystem 230 may include (i) any number of managers and controllers for any number of functions and (ii) any number of databases for any type of information that may be used to support communication.

In one design, profiles may be used to provide connectivity for active applications on wireless device 110. A profile may contain preferences for specific actions that wireless device 110 should perform to obtain connectivity. For example, a profile may identify preferences for certain radios over other radios, preferences for a particular radio under certain conditions, etc. Different profiles may be defined by different entities such as a user, a network operator, an original equipment manufacturer (OEM) or wireless device manufacturer, etc. The profiles may allow for conformance to the requirements of different entities.

A number of profiles may be defined. In one design, one or more of the following profiles may be defined:

User profile—store preferences for connectivity defined by the user,
Operator profile—store connectivity preferences defined by a network operator,
OEM profile—store connectivity preferences defined by an OEM,
Applications profile—store connectivity preferences for applications, and
Learned profile—store connectivity preferences determined based on learned patterns and behavior of wireless device 110.

A user profile may store preferences for connectivity defined by the user based on various considerations such as cost, privacy, battery usage, etc. An operator profile may store preferences for connectivity defined by a network operator, e.g., preferences for some radios over other radios when several radios are available. An OEM profile may store preferences for connectivity defined by an OEM, e.g., based on capabilities of wireless device 110, the available resources on wireless device 110, etc. An applications profile may store preferences for connectivity for applications on wireless device 110. An application may have certain requirements (e.g., for QoS), and each radio may have certain capabilities. The preferences may be based on the requirements of the applications, the capabilities of the radios, and/or other factors. The preferences may be used to select the proper radios to provide connectivity for the applications. A learned profile may store preferences for connectivity determined based on past activities or behavior of wireless device 110. Five types of profiles have been described above. Fewer, different, and/or additional profiles may also be defined and used to provide connectivity.

A radio may have one or more configurable parameters that may be adjusted to mitigate interference from the radio and/or to improve the performance of the radio. A configurable parameter may be for a physical component within the radio, such as an amplifier, a filter, an antenna, an antenna array, etc. A configurable parameter may also be for an operational parameter such as a transmit power level, a frequency channel, a traffic channel, a scheduled period, etc. A received power level may also be a configurable parameter if it can be varied, e.g., by selecting different antennas and/or more antennas. Each configurable parameter may be set to one of multiple possible settings/values applicable for that parameter. The radio may have an operating state, which may be defined by a particular setting for each configurable parameter. A configurable parameter may also be referred to as a "knob", a configurable parameter setting may also be referred to as a "knob setting", and an operating state may also be referred to as a "knob state".

In one design, an interference database may be defined for a given multi-radio platform, which may include all radios supported by wireless device 110. The interference database may be used to select radios for active applications and to reduce interference between active radios operating concurrently. The interference database may be provided in various formats.

In one design, the interference database may comprise a color chart having a number of cells for a number of operating states for different transmitter radios and receiver radios. The color chart may include a set of columns for each frequency channel on which a transmitter radio can operate. Each column set may include a number of columns for different operating states of the transmitter radio. The color chart may also include a set of rows for each frequency channel on which a receiver radio can operate. Each row set may include a number of rows for different operating states of the receiver radio. A cell may be defined for each unique combination of operating states of the transmitter and receiver radios. Cell (i, j) may correspond to operating state i for the transmitter radio and operating state j for the receiver radio. Cell (i, j) may be filled with the performance level (e.g., acceptable, marginal, or unacceptable) for the receiver radio with the transmitter radio in operating state i and the receiver radio in operating state j. The operating state of the transmitter radio and/or the operating state of the receiver radio may be varied, as needed, to obtain the desired performance.

Information regarding interference between radios may also be captured and stored in an interference database in other manners. For example, the interference information may be quantized in other ways, presented using other formats or structures, etc. Interference between radios may also be (i) measured in real time, (ii) computed a priori, stored, and retrieved as needed, and/or (iii) determined in other manners.

Wireless device 110 may perform system selection to select radios to provide connectivity for active applications. System selection refers to selection of one or more systems or radios to serve one or more applications. System selection may also include mapping of active applications to selected radios. System selection may also be referred to as radio selection, radio bearer selection, etc.

Wireless device 110 may support full system selection for active applications. Full system selection refers to selection of a single radio for an entire application for each direction, e.g., selection of a single transmitter radio for the transmit direction and a single receiver radio for the receive direction. All data for the application may be exchanged (e.g., sent or received) via the selected radio for each direction.

In an aspect, wireless device 110 may support fractional system selection for applications. For fractional system selection, an application may be partitioned into different fractions (i.e., parts or portions) that may be mapped to different radios for a given direction, one fraction of the application per radio. Fractional system selection may be used to improve performance for the application and/or obtain other benefits.

An application may be partitioned into fractions in various manners. In one design, the application may have a number of flows, and each flow may correspond to a fraction of the application. A flow may correspond to a logical entity, a logical channel, a physical channel, a traffic channel, a Transmission Control Protocol (TCP) flow, an Internet Protocol (IP) flow, a TCP/IP socket, etc. In general, a flow may comprise a stream of continuous or non-continuous data having certain characteristics. Data belonging to a flow may be identified based on the type of the data (e.g., traffic data or control data), requirements of the data, a source of the data, a destination of the data, etc. For example, an application for voice-over-IP (VoIP) may have one or more flows for traffic data and one or more flows for control data. In one design, a logical switch may receive data for an application at an input and may provide different portions of the data for the application to different flows at multiple outputs of the logical switch. A flow may be further partitioned into a number of subflows. An application may be partitioned into fractions in other manners.

Different fractions of an application may be mapped to different radios in various manners. In one design, different fractions of the application may be mapped to different radios based on requirements of the application, the capabilities of the radios, etc. For example, some radios may be able to provide certain QoS guarantees while other radios may not be able to provide QoS guarantees. The QoS guarantees may relate to a particular maximum delay, a particular minimum data rate or throughput, a particular average data rate, a particular peak data rate, etc. Some flows may have QoS requirements and may be mapped to radios with QoS guarantees that can satisfy the QoS requirements of the flows. Other flows may not have any QoS requirements and may be mapped to any radios including those with no QoS guarantees. Applications may also be mapped to radios based on other factors, as described below.

Figure 3A:
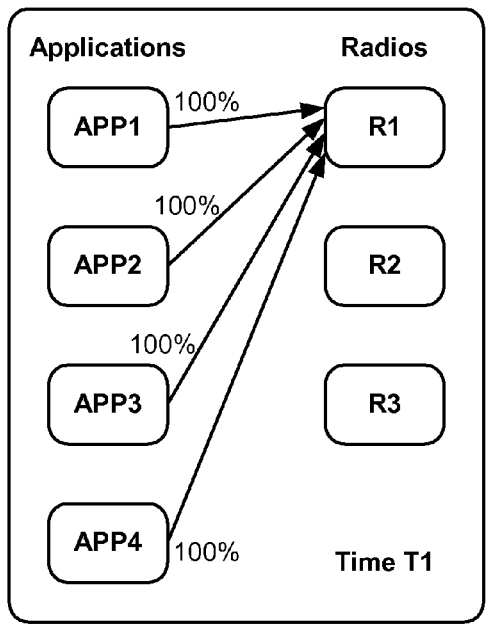
FIG. 3A shows full system selection for multiple applications.

FIG. 3A shows an example of full system selection for a single radio supporting multiple applications. Wireless device 110 may have four applications APP1 to APP4 that are active and may include three radios R1 to R3. In the example shown in FIG. 3A, only radio R1 may be available for use at time T1, and radios R2 and R3 may be unavailable. All four active applications APP1 to APP4 may be mapped to radio R1 at the same time. Data for the four active applications may be multiplexed and exchanged (e.g., sent or received) via the single available radio. Many conventional wireless devices support a single active radio at any given time and also map all active applications to this single radio.

Figure 3B:
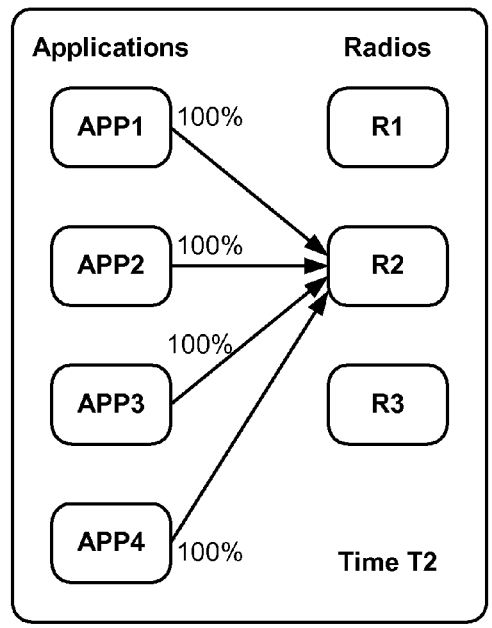
FIG. 3B shows flow mobility for applications.

FIG. 3B shows an example of flow mobility for applications with full system selection. At time T2, which may be later than time T1, radio R2 may become available on wireless device 110, and radio R1 may become unavailable. All four active applications APP1 to APP4 may be moved from radio R1 to radio R2. Flow mobility refers to handoff of an application from one radio to another radio. Each application may operate in the same manner before and after handoff and may be unaware of whether radio R1 or radio R2 is serving the application. With full system selection, all applications that are mapped to a given radio may be handed off to a new radio.

Figure 3C:
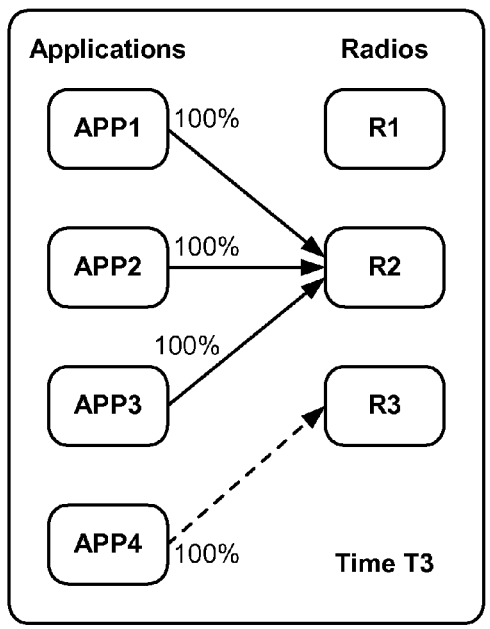
FIG. 3C shows flow mobility for an application.

FIG. 3C shows another example of flow mobility for an application with full system selection. At time T3, which may be later than time T2, radio R3 may become available on wireless device 110, and radio R2 may also be available. In the example shown in FIG. 3C, application APP4 may be moved from radio R2 to radio R3 while the other three applications APP1 to APP3 may remain mapped to radio R2. Flow mobility may be used to address changes in the capacity of radios due to changing channel conditions, increase overall throughput, balance system loading, and/or obtain other advantages.

Figure 3D:
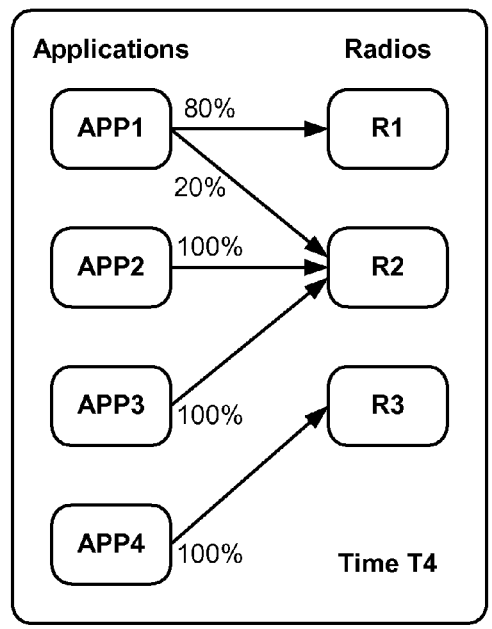
FIG. 3D shows fractional flow mobility for an application.

FIG. 3D shows an example of fractional flow mobility for an application. At time T4, which may be later than time T3, radio R1 may become available on wireless device 110, and radios R2 and R3 may also be available. In the example shown in FIG. 3D, a first fraction of 80% of application APP1 may be mapped to radio R1, and a second fraction of 20% of application APP1 may be mapped to radio R2. Fractional flow mobility refers to migration of a fraction of an application to an arbitrary radio, so that the application may be mapped to multiple radios at the same time. Fractional flow mobility may be used to increase overall throughput for an application, balance system loading, and/or obtain other advantages.

FIG. 3D shows an example of fractional flow mobility. In general, an application may be mapped to any number of radios. Furthermore, any fraction of the application may be mapped to each radio.

Flow mobility in FIG. 3B and FIG. 3C and/or fractional flow mobility in FIG. 3D may be supported (i) by wireless device 110 using one or more protocols such as Dual Stack Mobile IP version 6 (DSMIPv6) and (ii) by one or more network entities such as, e.g., a Home Agent (HA).

In general, a fraction f of an application may refer to any percentage of the application less than 100% and may be within a range of 0 to 1, so that $0 \leq f < 1$. Since the entire application may be represented by an integer of 1, fraction f does not exceed unity. All fractions of the application should add up to 1, so that $$\sum_n f_n = 1,$$

where $f_n$ is the percentage of the n-th fraction of the application, and the summation is over all fractions of the application.

A radio may support one or more applications, depending on the capabilities of the radio, the requirements of the applications, and/or other factors. The radio may support only a fraction of one application, or all of one application, or all or a fraction of each of multiple applications. The total number of applications that can be supported by the radio may exceed unity. For example, radio R2 in FIG. 3D supports 2.2 applications. In general, the number of applications that can be supported by a radio may be constrained by the capacity of the radio, the requirements of each application, and possibly other constraints for wireless device 110. These other constraints may include the available battery on wireless device 110, the interference and channel conditions observed by the radios, etc. There may also be constraints outside of wireless device 110 (e.g., within one or more networks that experience congestion) and which may impact the number of available radios on wireless device 110.

Figure 4A:
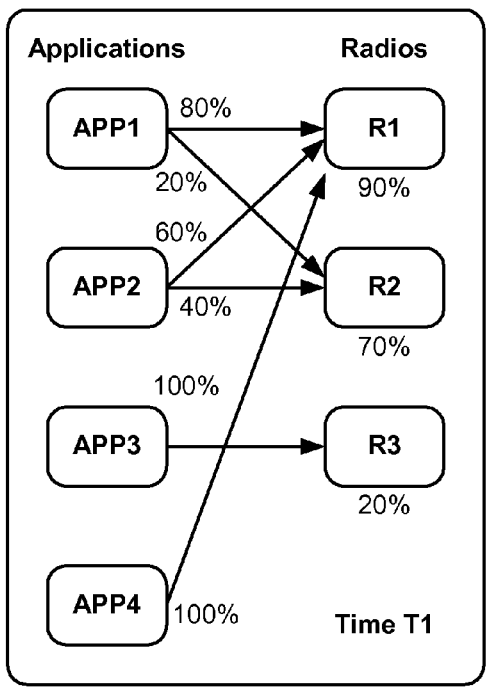
FIG. 4A shows fractional system selection for multiple applications.

FIG. 4A shows an example of fractional system selection for a case in which wireless device 110 has four active applications APP1 to APP4 and includes three available radios R1 to R3. In the example shown in FIG. 4A, at time T1, a first fraction of 80% of application APP1 may be mapped to radio R1, and a second fraction of 20% of application APP1 may be mapped to radio R2. A first fraction of 60% of application APP2 may be mapped to radio R1, and a second fraction of 40% of application APP2 may be mapped to radio R2. The entire application APP3 may be mapped to radio R3, and the entire application APP4 may be mapped to radio R1. Radio R1 may support three applications APP1, APP2 and APP4 using 90% of its capacity. Radio R2 may support two applications APP1 and APP2 using 70% of its capacity. Radio R3 may support one application APP3 using 20% of its capacity.

Figure 4B:
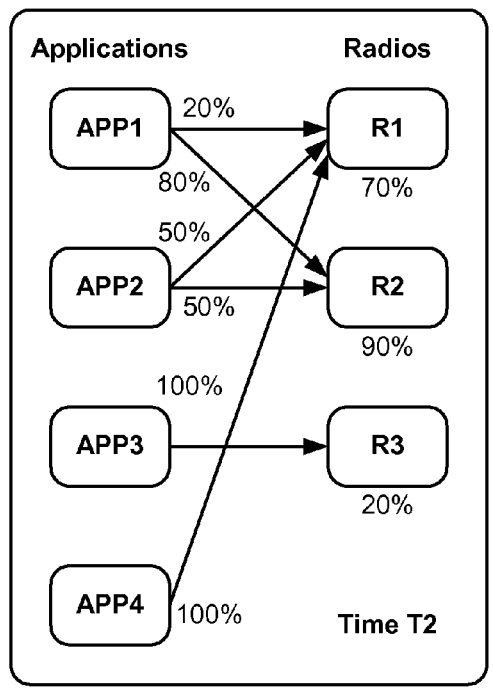
FIG. 4B shows fractional flow mobility for an application.

FIG. 4B shows an example of fractional flow mobility for an application. In the example shown in FIG. 4B, at time T2 later than time T1, a fraction of 20% of application APP1 may be mapped to radio R1, and a fraction of 80% of application APP1 may be mapped to radio R2. A fraction of 50% of application APP2 may be mapped to radio R1, and a fraction of 50% of application APP2 may be mapped to radio R2. The entire application APP3 may be mapped to radio R3, and the entire application APP4 may be mapped to radio R1. Radio R1 may support three applications APP1, APP2 and APP4 using 70% of its capacity. Radio R2 may support two applications APP1 and APP2 using 90% of its capacity. Radio R3 may support one application APP3 using 20% of its capacity.

As shown in FIG. 4B, for fractional flow mobility, the fractions of an application mapped to different radios can change, so that different percentages of the application may be mapped to a given radio at different times. The mapping/assignment of applications to radios may change based on changing application requirements, radio capabilities, channel conditions, etc.

Figure 4C:
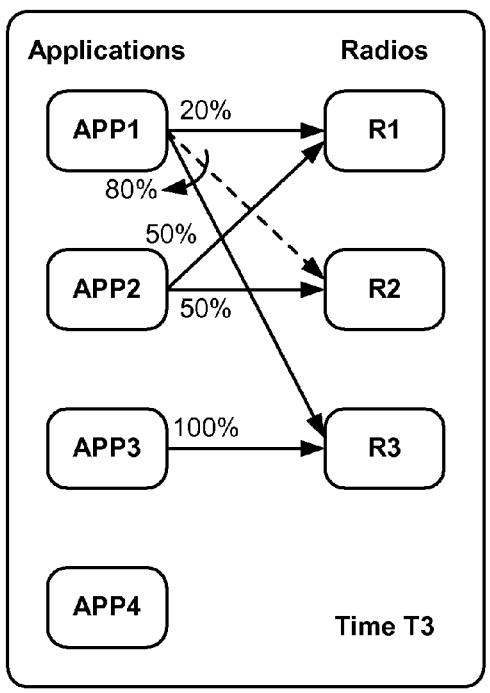
FIG. 4C shows fractional handover for an application.

FIG. 4C shows an example of fractional handover for an application. Fractional handover refers to handover of a fraction of an application from an old radio to a new radio. In the example shown in FIG. 4C, at time T3 later than time T2, a fraction of 20% of application APP1 may be mapped to radio R1, and a fraction of 80% of application APP1 may be moved from radio R2 to radio R3. Applications APP2 and APP3 may be mapped to radios R1, R2 and R3 as described above for FIG. 4B. Application APP4 may become inactive and may be removed from radio R3. As shown in FIG. 4C, a fraction of an application may be moved to a new radio for fractional handover. As also shown in FIG. 4C, an application may be removed from all radios to which the application is mapped when the application becomes inactive.

In general, fractional flow mobility may include (i) selecting a different radio for a fraction of an application (e.g., as shown in FIG. 4C) and/or (ii) changing the percentage of an application mapped to a radio (e.g., as shown in FIG. 4B).

Figure 5B:
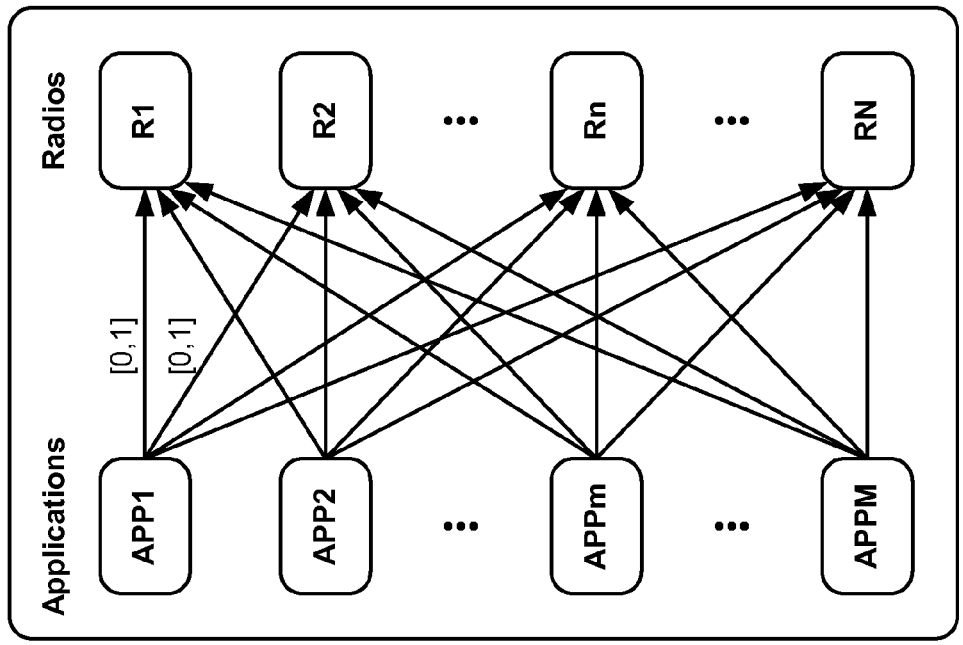
FIG. 5B shows fractional system selection for multiple applications.
Figure 5A:
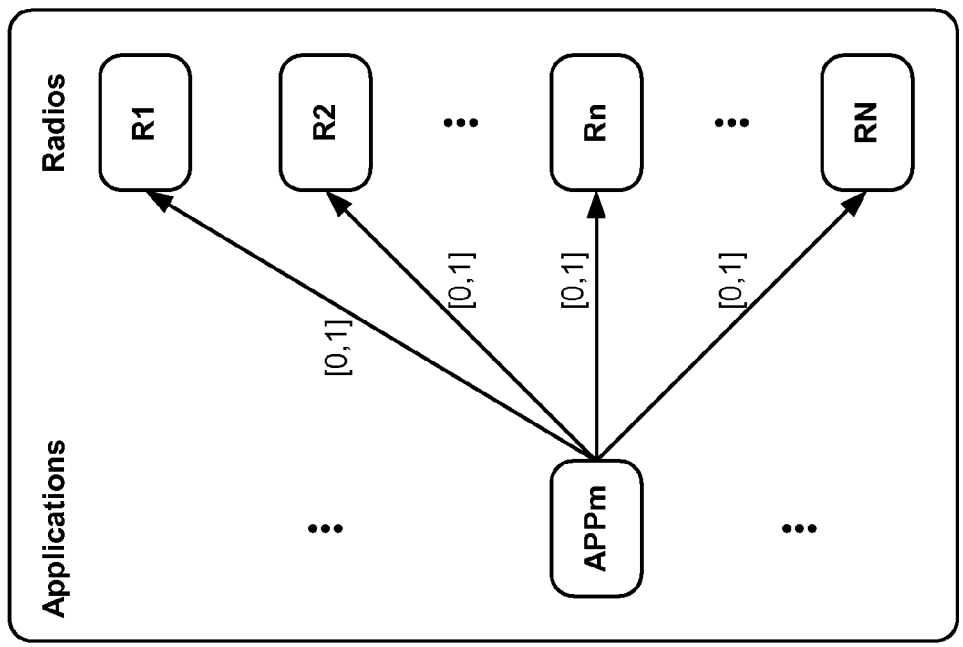
FIG. 5A shows fractional system selection for one application.

FIG. 5A shows fractional system selection for one application APPm. Wireless device 110 may have N available radios R1 to RN, where N may be any integer value greater than one. Different fractions of application APPm may be mapped to different radios. The fraction of application APPm mapped to each radio may be within a range of 0 to 1. A fraction of 0 for a particular radio may mean that application APPm is not mapped to that radio. The sum of the N fractions of application APPm mapped to the N radios R1 to RN may be equal to 1, as described above.

FIG. 5B shows fractional system selection for multiple applications. Wireless device 110 may have M active applications APP1 to APPM and N available radios R1 to RN, where M and N may each be any integer value greater than one. In general, a fraction of $f_{m,n}$ of an application APPm may be mapped to a radio Rn, where $0 \le f_{m,n} < 1$, $m \in \{1, \ldots, M\}$, and $n \in \{1, \ldots, N\}$. The sum of all fractions of each application may be equal to 1, or $$\sum_{n=1}^{N} f_{m,n} = 1.$$

The mapping or interconnections between the M applications and the N radios may be viewed as a trellis. The interconnection between a given application APPm and a given radio Rn may be associated with a particular percentage, which may be referred to as a trellis percentage. This percentage may be within the range of 0 and 100 and may be indicative of the fraction of application APPm being mapped to radio Rn. In a fully connected trellis, there may be M*N interconnections between the M applications and the N radios, as shown in FIG. 5B. However, some interconnections may be associated with a percentage of 0 and may be removed from the trellis.

In general, M active applications may be mapped to N available radios based on full and/or fractional system selection. For example, some applications may be mapped to radios based on fractional system selection, and remaining applications may be mapped to radios based on full system selection. An application may be mapped to multiple radios with fractional system selection or to a single radio with full system selection.

For fractional system selection, fractions of each application may be mapped to different radios based on a mapping function, which may be referred to as a gamma function or algorithm. In one design, the mapping function may perform both (i) radio selection to determine which radios to select for use and (ii) fractional flow assignment to determine which fraction of each application to map to each selected radio. In another design, the mapping function may only perform fractional flow assignment to determine which fraction of each application to map to each selected radio. For both designs, the mapping function may be defined in various manners and based on any set of inputs. In one design, the mapping function may be defined based on one or more of the following:

Requirements of applications,
Preferences of applications,
Capabilities of radios, Status of wireless device 110,
Constraints of wireless device 110,
Capabilities of wireless networks, and
Status of wireless networks, e.g. pertaining to traffic and/or signaling channel congestion.

The requirements of applications may be quantified by various parameters such as minimum throughput (e.g., 100 Kbps), maximum latency (e.g., 1 millisecond (ms)), maximum jitter, maximum connection time (e.g., 250 ms), maximum call drop rate (e.g., $10^{-3}$), etc. Different applications may have different requirements. For example, applications such as video streaming may have minimum throughput and maximum latency requirements. These applications may stall or fail if these requirements are not met in real time. Other applications such as FTP may have no fundamental minimum throughput or maximum latency requirements. Hence, a user/desired throughput and no minimum latency may be specified for these applications, and the traffic for these applications may be regarded as best effort.

In general, an application may or may not provide its requirements to connection manager 240 and/or other modules within wireless device 110. If an application does not explicitly provide its requirements, then one or more requirements of the application may be determined based on any information available for the application. For example, a data rate requirement for an application may be determined from an application data stream format, which may contain source coding overhead to ensure error free reception at a receiver.

In one design, application requirements and/or network impact in terms of traffic and/or signaling loading may be exchanged between wireless device 110 and a network. Wireless device 110 may use the information on traffic and/or signaling loading at the network to select radios, to map applications to radios, and/or to perform other functions.

The preferences of applications may be provided by the profile database. For example, an application may prefer a particular radio over other radios when several radios are available.

The status of wireless device 110 may include battery state of the wireless device, currently active applications in the wireless device, applications that are in a queue awaiting execution based on conditions such as sufficient battery power or sufficient network capabilities, actual or estimated impact of applications on the radio technologies supported by wireless device 110, etc. The constraints of wireless device 110 may include battery life, channel conditions for active radios in wireless device 110, known or determined interference or other impacts among active radios in wireless device 110, known or determined impacts of multiple concurrent applications on processing capability of wireless device 110 and/or on network traffic and/or signaling congestion, etc.

The capabilities of radios may be quantified by the performance of the radios, the features or functions supported by the radios, etc. The performance of the radios may be quantified by various performance metrics, which may include interference-related metrics. The interference-related metrics may be dependent on interference between radios and may include (i) the amount of desense on a receiver radio due to transmit power from a transmitter radio on wireless device 110, (ii) the percentage of time overlap of two or more radios in time division multiplex (TDM) operation, (iii) the amount of frequency overlap in frequency division multiplex (FDM) or concurrent operation, and/or (iv) other metrics related to interference. The performance metrics may be indicative of performance of radios and may include (i) the percentage level of congestion of a link from a maximum rate, (ii) the percentage level of delay in a link from nominal, etc.

The performance metrics may be a function of time and may be dependent on various factors such as which radios are available and selected, the operating state of each radio, the requirements of active applications, channel conditions, etc. The operating state of a radio may be a function of the particular settings of different configurable parameters of the radio. The performance metrics may be represented in various forms such as with a scalar, a vector, a matrix, etc. For example, a performance metric may be given by a "color" of a cell in a color chart and may take on one of a limited number of colors (e.g., green, yellow, and red). A performance metric may be given in a form that may be dependent on the techniques used to mitigate interference.

Some performance metrics may be measured directly by wireless device 110 whereas other performance metrics may be computed from measurements. Some examples of measurable performance metrics may include metrics related to throughput, latency, jitter, etc. Computable performance metrics may be obtained by measuring certain quantities (e.g., interference levels between transmitter and receiver radios, receiver desense, etc.) and converting the measured quantities to performance metrics (e.g., throughput).

Performance metrics may be used to consider the impact of interference environment with coexisting radios on wireless device 110. In general, application requirements are typically harder to meet with increased interference. The amount of degradation due to interference (e.g., throughput versus interference) may be quantified by computer simulation, modeling, empirical measurement, etc., and may be used to compute performance metrics. Different application requirements may have different dependencies on interference level. Some application requirements such as throughput and latency may be more immune to interference level than connection time and call drop rate. These different levels of immunity may be taken into account by the mapping function to gauge acceptable interference levels or trigger points for different applications.

The mapping function may be implemented in various manners. An exemplary implementation of the mapping function for one application is described below.

Figure 6:
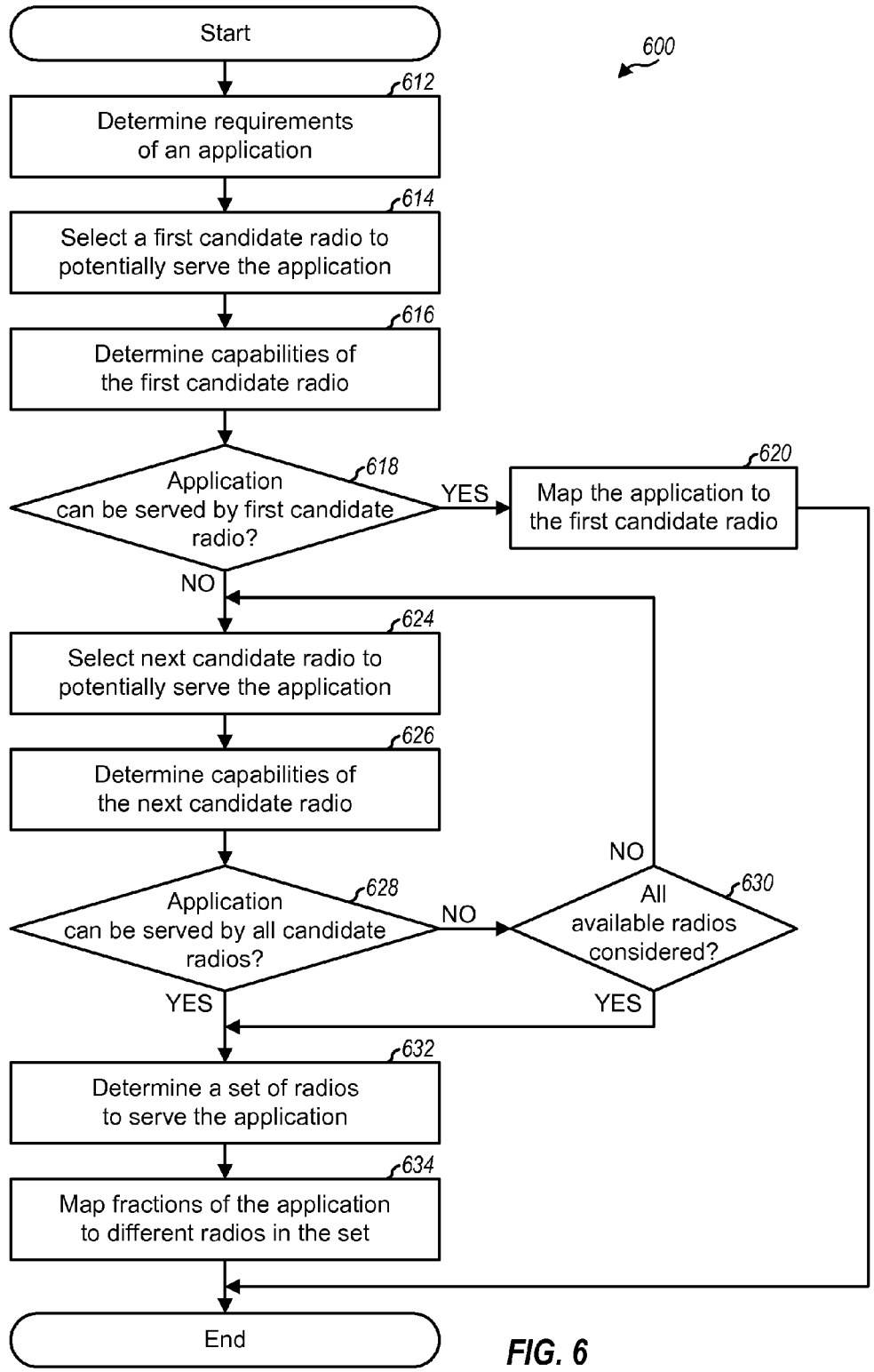
FIG. 6 shows a process for mapping an application to one or more radios.

FIG. 6 shows a design of a process 600 for mapping an application to one or more radios. Initially, the requirements of the application may be determined (block 612). A first candidate radio may be selected to potentially serve the application (614). The first candidate radio may be the best radio advertising a peak rate that can meet the application requirements or may be a radio selected in some other manner. Capabilities (e.g., throughput) of the first candidate radio may be determined, e.g., based on performance metrics for the first candidate radio (block 616). A determination may then be made whether the application can be served by the first candidate radio based on the application requirements and the radio capabilities (block 618). For example, the throughput supported by the first candidate radio may be measured directly or computed based on one or more performance metrics. The application can be served by the first candidate radio if the throughput supported by the radio meets or exceeds the throughput required by the application. The application may be mapped to the first candidate radio if it can serve the application (block 620).

Otherwise, if the first candidate radio by itself cannot serve the application, then a next candidate radio may be selected to potentially serve the application (block 624). The next candidate radio may be the next best available radio or may be a radio selected in some other manner. Capabilities (e.g., throughput) of the next candidate radio may be determined (block 626). A determination may then be made whether the application can be served by all candidate radios based on the application requirements and the radio capabilities (block 628). If the answer is 'No', then a determination may be made whether all available radios have been considered (block 630). If at least one available radio has not been considered, then the process may return to block 624 to select another candidate radio. Otherwise, if the answer is 'Yes' for block 628 or 630, then a set of radios may be selected to serve the application (block 620). This set may include all of some of the candidate radios selected in blocks 614 and 624. Fractions of the application may be mapped to different radios in the selected set of radios (block 632).

In one design, the mapping of the application to radios may be static and applicable for the entire duration in which the application is active. In another design, the mapping may be dynamic and may change based on changes to any of the factors listed above. For example, process 600 may be performed periodically while the application is active.

FIG. 6 shows a simple case of mapping one application to one or more radios. Multiple applications may also be mapped to multiple radios in a similar manner. In general, one or more radios may be selected to serve one or more applications. Radios may be selected (e.g., one at a time) until the selected radios can serve all active applications or all available radios have been selected.

In one design, the mapping of applications to radios may be given by a mapping matrix having (i) M rows corresponding to M active applications and (ii) N columns corresponding to N available radios. The entry in the m-th row and n-th column of the mapping matrix may indicate the percentage of application APPm being mapped to radio Rn. The N entries in each row should sum to 1. The mapping may be a function of time, application requirements, radio performance/capabilities, etc. The mapping matrix may be valid for a particular time interval and may change from time interval to the time interval. Changes in the mapping matrix may reflect handoff of entire applications or fractions of applications between radios, changes in the percentage of applications mapped to different radios, etc.

The mapping function may describe a state variable as a function of time. The state variable may correspond to a M×N mapping matrix whose elements may be updated according to an algorithm. In one design, the algorithm may be an adaptive algorithm such as a least mean squares (LMS) algorithm. In this design, the state variable (e.g., the M×N mapping matrix) at time t+1 may be updated as a function of the state variable at time t and other parameters, which may include one or more performance metrics, a step size for updating, etc. The algorithm for updating the mapping function may also be some other adaptive algorithm or some other suitable algorithm.

Selection of radios and/or mapping of applications to radios may be performed periodically and/or when triggered in order to meet one or more objective functions. The objective functions may include meeting or exceeding applications requirements, minimizing power consumption of wireless device 110, minimizing impact on traffic and/or signaling channels of one or more wireless networks, etc. Dynamic/adaptive radio selection and/or application-to-radio mapping may be especially desirable to address changing channel conditions. Channel conditions may be ascertained through channel monitoring/measuring, e.g., via feedback of channel quality indicator (CQI), channel state information (CSI), received signal strength indicator (RSSI), signal-to-noise ratio (SNR), bit error rate (BER), and/or other metrics from a receiver to a transmitter. Changing channel conditions may cause variations in the throughput/capability of radios and may be addressed by performing fractional system selection periodically and/or when triggered.

In the design shown in FIG. 2, connection manager 240 and coexistence manager 260 may support (i) full and/or fractional system selection to select radios for applications and to map applications to radios and (ii) full and/or fractional flow mobility to move applications between radios. Coexistence manager 260 and connection manager 240 may perform various functions to support system selection and flow mobility.

In one design, coexistence manager 260 may mitigate interference between multiple active radios operating concurrently on wireless device 110. Coexistence manager 260 may mitigate interference based on one or more of the following:

Transmit equalization and power backoff—reduce transmit power of a transmitter radio to reduce interference to a receiver radio, Protocol frame (time) alignment—align timing of radios of different radio technologies (e.g., LTE and Bluetooth) to reduce collisions between the radios, TDM arbitration—schedule different radios to operate in different time intervals to avoid concurrent operations of the radios, Knob adjustment—adjust operating states of radios to mitigate interference, and Interference cancellation—estimate and cancel interference from one or more transmitter radios at a receiver radio.

Coexistence manager 260 may also mitigate interference based on other techniques. The techniques used to mitigate interference may have an impact on the form of the performance metrics. For example, the performance metrics may be a function of the amount of transmit power backoff, the number of collision events between radios in frame alignment, etc.

Coexistence manager 260 may attempt to improve the performance of radios (e.g., as measured by performance metrics) using one or more interference mitigation techniques. Coexistence manager 260 may have a direct impact on certain performance measures of applications (e.g., call connection time and/or call drop rate) and an indirect impact on other performance measures of applications (e.g., throughput, delay, and/or jitter).

Coexistence manager 260 may be mainly concerned with radios and not applications. However, coexistence manager 260 may be aware of applications (e.g., requirements and/or preferences of applications) in selecting radios for use and controlling the selected radios. In some designs, coexistence manager 260 may receive pertinent information from connection manager 240 and may select and control radios based on the pertinent information. This information may include application ID, application requirements, active radio list, radio priorities, radio event priorities, etc. This information may also include a mapping of applications to radios, which may be used by coexistence manager 260 to adjust radios, determine performance metrics for radios, etc.

In one design, connection manager 240 may receive requirements of applications, which may include the requirements described above. Connection manager 240 may apply applicable policies (e.g., from a network operator) and profiles to determine preferred radios for the applications. The profiles may include a user profile that sets user requirements on specific applications. Connection manager 240 may assign priorities to radios and/or their events, which may influence the operation of coexistence manager 260. Connection manager 240 may send pertinent information to coexistence manager 260 to assist with radio selection and/or interference mitigation.

Connection manager 240 may map applications to radios based on the requirements of the applications, the capabilities of radios, etc. For example, connection manager 240 may map application APP1 to radios R1 and R2 (e.g., for CDMA 1X cellular and WLAN), application APP2 to radio R3 (e.g., for EVDO with high QoS), and application APP3 to radio R1 (e.g., for CDMA 1X cellular for MMS).

In one design, connection manager 240 may launch link-based probes and/or path-based probes to estimate throughput, latency, and/or other parameters for selected radio(s). A link-based probe may be launched to estimate the performance of a radio link between wireless device 110 and a base station in a wireless network via a selected radio on wireless device 110. A path-based probe may be launched to estimate the performance of an end-to-end communication path from wireless device 110 to an endpoint via a selected radio, a base station, and other network entities. Connection manager 240 may launch link-based probes and/or path-based probes upon receiving application requirements, or after selecting radio(s) for an application, or at other times. Connection manager 240 may receive performance information from the link-based probes and/or path-based probes and may use the performance information to map applications to radios.

Figure 7:
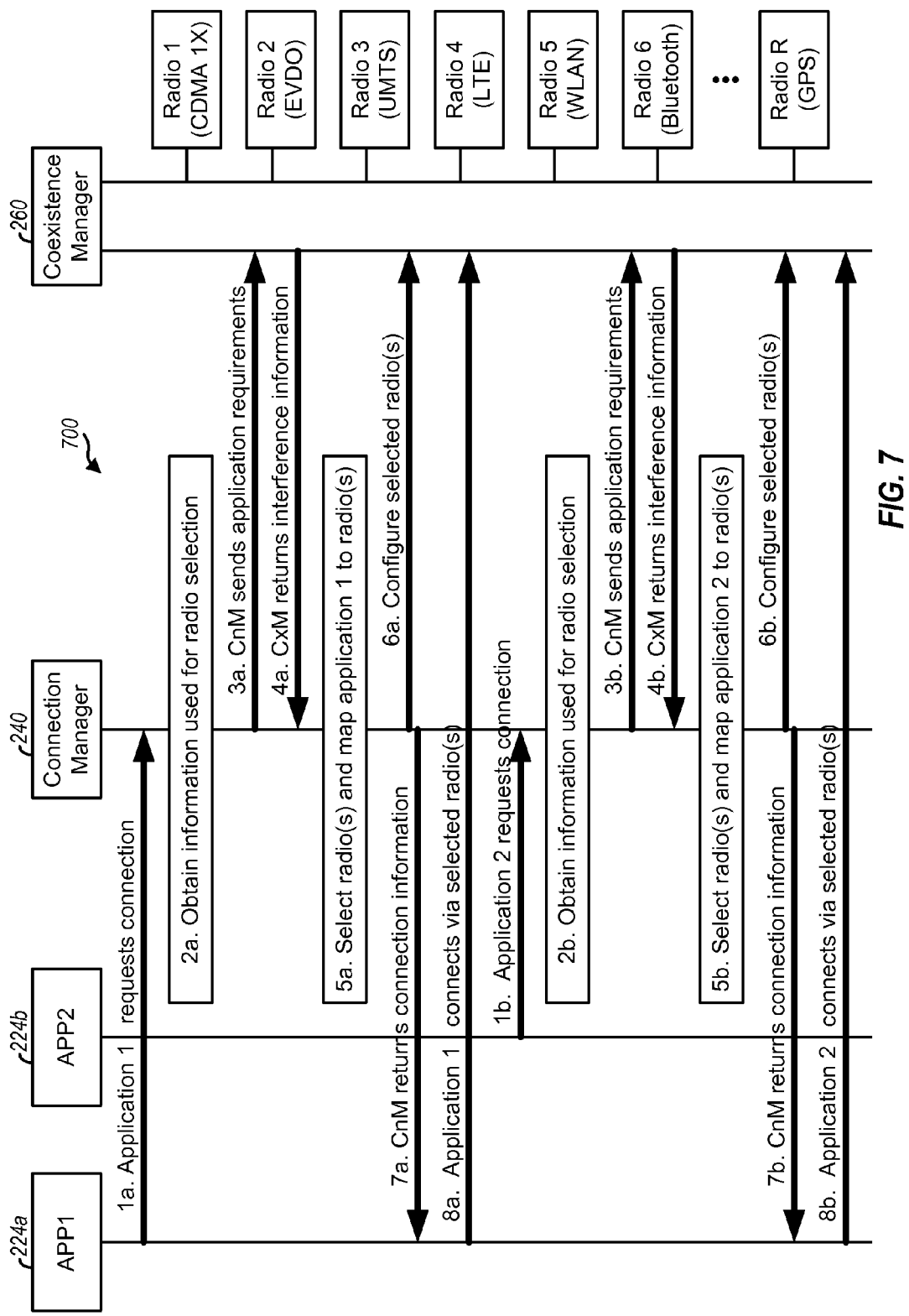
FIG. 7 shows a process for performing system selection for applications.

FIG. 7 shows a design of a process 700 for performing system selection for active applications. A first application APP1 224a may become active and may send a connection request to connection manager 240 (step 1a). Connection manager 240 may receive the connection request and may obtain system selection information used to select one or more radios for application 224a (step 2a). The system selection information may comprise requirements provided by application 224a and/or obtained from CnM database 252, profiles and/or preferences for application 224a, the status of wireless device 110, etc.

Connection manager 240 may generate a list of applicable radios that can be used for application 224a and/or a list of preferred radios for application 224a based on the system selection information. Connection manager 240 may assign priorities to the applicable and/or preferred radios and their events. For example, a LTE radio may have a higher priority than a 1× radio, which may have a higher priority than a WLAN radio for application 224a. Connection manager 240 may provide an application ID, the application requirements, the applicable and/or preferred radios for application 224a, the priorities of the radios and/or their events, and/or other information to coexistence manager 260 (step 3a).

Coexistence manager 260 may receive the information from connection manager 240 and may determine radios available for use on wireless device 110. Coexistence manager 260 may mitigate interference among the available radios. Coexistence manager 260 may provide radio-related information to connection manager 240 (step 4a). The radio-related information may comprise performance metrics for radios, information indicative of interference between the radios, channel conditions, etc.

Connection manager 240 may receive the radio-related information for the available radios from coexistence manager 260. Connection manager 240 may select one or more radios for application 224a based on the application requirements, the radio capabilities, the priorities of the radios and/or their events, etc. (step 5a). Connection manager 240 may also map application 224a to the selected radio(s). For full system selection, connection manager 240 may select a single radio for each direction (e.g., transmit or receive) and may map the entire application 224a to the single radio for each direction. For fractional system selection, connection manager 240 may select multiple radios for application 224a for a given direction and may map a fraction of application 224a to each radio selected for that direction.

Connection manager 240 may send a configuration request to coexistence manager 260 to configure the selected radio(s) for application 224a (step 6a). Connection manager 240 may also return connection information to application 224a (step 7a). The connection information may indicate the selected radio(s) for application 224a and/or provide other information used by application 224a to obtain connectivity for data to be sent and/or received by application 224a. Application 224a may then obtain connectivity via the selected radio(s) (step 8a).

At a later time, a second application APP2 224b may become active and may send a connection request to connection manager 240 (step 1b). Connection manager 240 may receive the connection request and may obtain system selection information used to select one or more radios for application 224b (step 2b). Connection manager 240 may provide an application ID, the application requirements, the applicable and/or preferred radios for application 224b, the priorities of the radios and/or events, and/or other information to coexistence manager 260 (step 3b). Coexistence manager 260 may receive the information from connection manager 240, determine radios available for use on wireless device 110, and mitigate interference among the available radios, e.g., based on the information received from connection manager 240. Coexistence manager 260 may provide radio-related information to connection manager 240 (step 4b).

Connection manager 240 may receive the radio-related information for the available radios from coexistence manager 260. Connection manager 240 may select one or more radios for application 224b and may map application 224b to the selected radio(s) based on full or fractional system selection (step 5b). Connection manager 240 may map applications to radios in step 5b by taking into account all active applications and all available radios. For example, connection manager 240 may remap all or factions of application 224a in step 5b based on the requirements of applications 224a and 224b and the capabilities of the available radios. Connection manager 240 may send a configuration request to coexistence manager 260 to configure the selected radio(s) for application 224b (step 6b). Connection manager 240 may also return connection information to application 224b (step 7b). Application 224b may then obtain connectivity via the selected radio(s) (step 8b).

FIG. 7 shows an exemplary design of performing system selection with a specific sequence of steps. System selection may also be performed in other manners, e.g., with other sequences of steps that may be different from the sequence of steps in FIG. 7.

Connection manager 240 and coexistence manager 260 may interact in various manners for system selection and flow mobility. Two schemes for interaction between connection manager 240 and coexistence manager 260 are described below and are referred to as uni-directional CxM/CnM interaction and bi-directional CxM/CnM interaction.

For uni-directional CxM/CnM interaction, control may flow from coexistence manager 260 to connection manager 240 for system selection and flow mobility. Connection manager 240 may have requirements of applications and may determine the mapping between applications and radios.

Figure 8A:
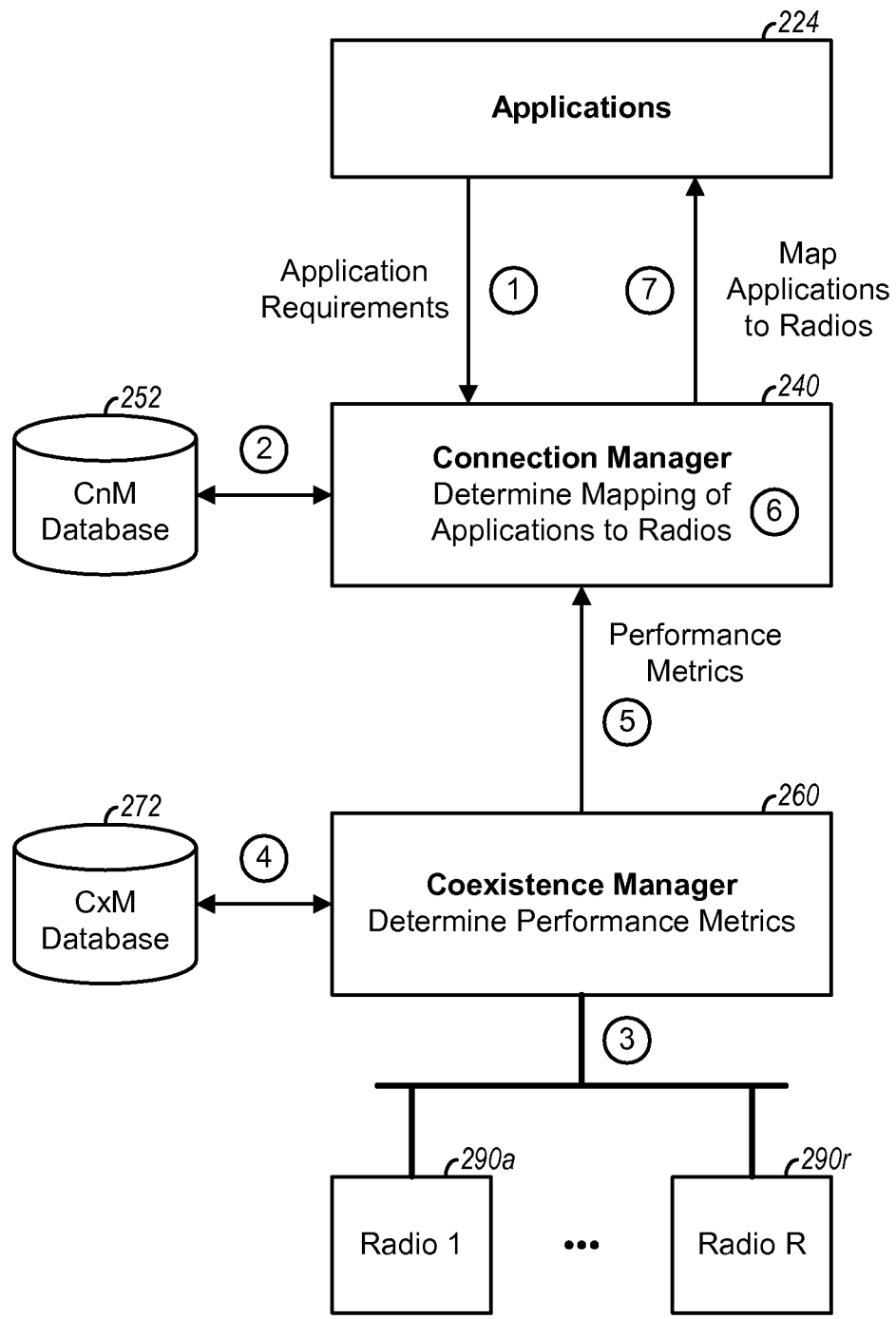
FIGS. 8A and 8B show uni-directional and bi-directional interaction between a connection manager and a coexistence manager on the wireless device.

FIG. 8A shows a design of uni-directional CxM/CnM interaction. Active applications 224 may provide their requirements to connection manager 240 (step 1). Connection manager 240 may receive the requirements of the active applications and may apply applicable policies (e.g., from a network operator) and profiles to determine preferred radios for the applications (step 2).

Coexistence manager 260 may determine radios that are available for use on wireless device 110 based on which wireless networks are available (step 3). Coexistence manager 260 may select certain radios over other radios due to interference impact between radios, channel conditions, throughput estimates, etc. Coexistence manager 260 may determine interference impact among the radios and may interact with coexistence database 272 to determine suitable settings for the operating parameters of the radios to mitigate interference and improve performance (step 4). Coexistence manager 260 may provide a list of available or selected radios and their capabilities (e.g., performance metrics) to connection manager 240 (step 5).

Connection manager 240 may select radios for use and may map the active applications to the selected radios based on the requirements of the applications, the capabilities of the radios, and/or other criteria (step 6). Connection manager 240 may determine the mapping of applications to radios based on information on coexistence impact between the selected radios from coexistence manager 260 such that the application requirements can be met with little coexistence impact.

In one design, the steps in FIG. 8A may be performed once to select radios and map the active applications to the selected radios. This design may reduce processing overhead for mapping applications to radios. In another design, some or all of the steps in FIG. 8A may be iterated multiple times (e.g., in real time) to meet application requirements and/or to obtain better performance.

For uni-directional CxM/CnM interaction, coexistence manager 260 may select radios for use and/or adjust the radios based on (i) interference information and/or other information available to coexistence manager 260 and (ii) little or no information from connection manager 240. For example, connection manager 240 may send some information to enable coexistence manager 260 to mitigate interference between radios. The information may comprise an available or preferred radio list, radio priorities, radio event priorities, frequency bands and channels, modes of radio operation such as concurrent dual-band WLAN operation in 2.4 GHz and 5 GHz bands or concurrent cellular carrier aggregation operation for LTE and/or HSPA, application requirements, application flow separation identifiers (how to identify application flows within an application), etc. Application requirements may be known to connection manager 240 but not provided to coexistence manager 260. Connection manager 240 may obtain performance metrics for the selected radios from coexistence manager 260 and may map applications to the selected radios.

For bi-directional CxM/CnM interaction, control may flow from coexistence manager 260 to connection manager 240, and also vice versa, for system selection and flow mobility. In one design of bi-directional CxM/CnM interaction, connection manager 240 may provide pertinent information (e.g., requirements of applications) to enable coexistence manager 260 to select radios and possibly adjust operating parameters of the radios to obtain good performance. Coexistence manager 260 may provide a list of selected radios and their capabilities to connection manager 240. Connection manager 240 may then map the active applications to the selected radios based on the requirements of the applications, the capabilities of the radios, and/or other criteria. For bi-directional CxM/CnM interaction, coexistence manager 260 may select radios for use and/or adjust the radios based on (i) pertinent information from connection manager 240 and (ii) interference information, channel information, and/or other information available to coexistence manager 260.

Figure 8B:
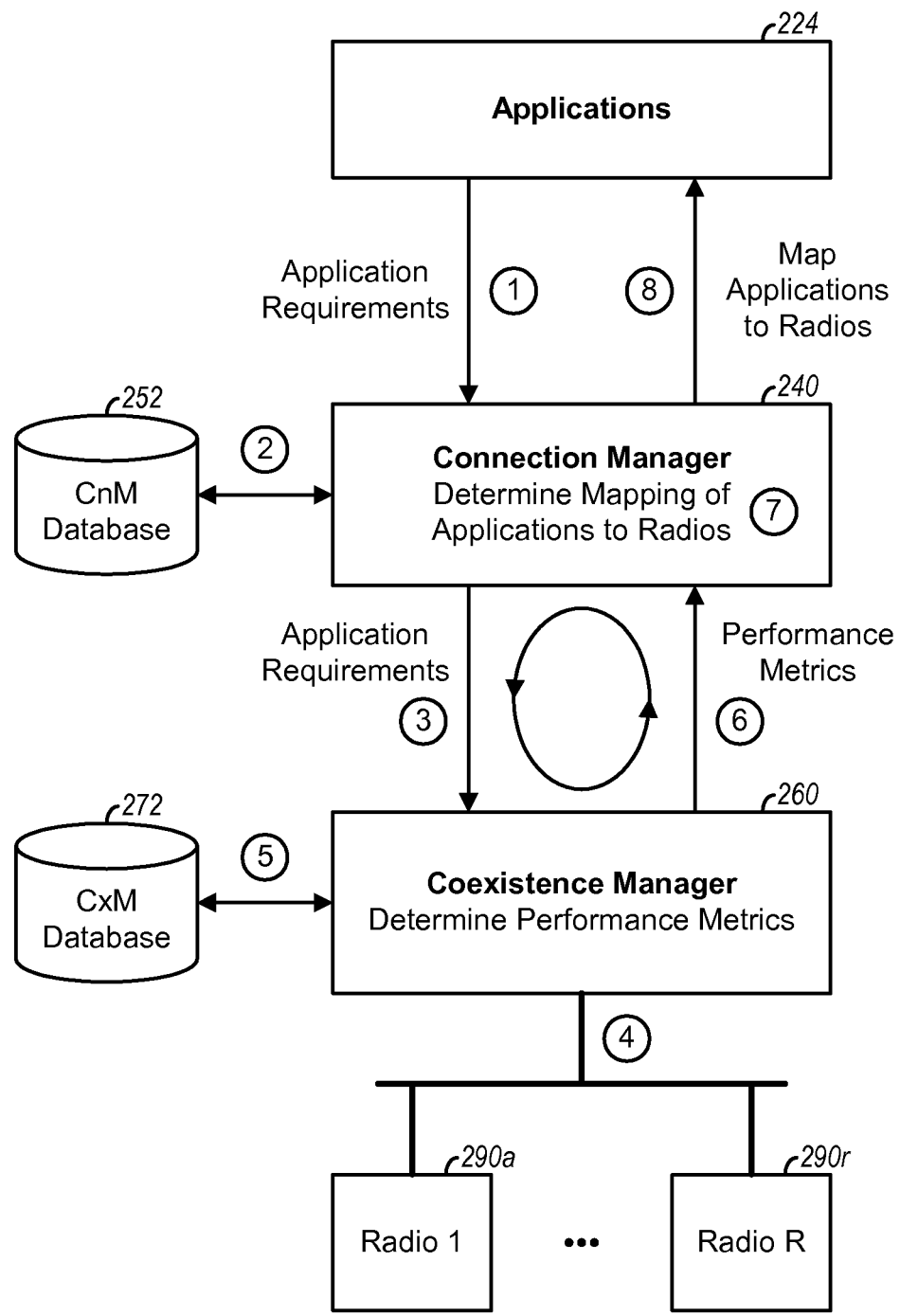

FIG. 8B shows a design of bi-directional CxM/CnM interaction. Active applications 224 may provide their requirements to connection manager 240 (step 1). Connection manager 240 may apply applicable policies and profiles to determine preferred radios for the applications (step 2). Connection manager 240 may provide the application requirements and possibly the preferred radios to coexistence manager 260 (step 3).

Coexistence manager 260 may determine radios that are available for use based in part on the information received from connection manager 240 (step 4). Coexistence manager 260 may determine interference impact among the radios, determine channel conditions, estimate throughput, etc. Coexistence manager 260 may interact with coexistence database 272 to determine suitable settings for the operating parameters of the radios to mitigate interference and improve performance (5). Coexistence manager 260 may provide a list of available or selected radios and their capabilities (e.g., performance metrics) to connection manager 240 (step 6). Connection manager 240 may select radios for use and may map the active applications to the selected radios based on the requirements of the applications, the capabilities of the radios, and/or other criteria (step 7).

In one design, the steps in FIG. 8B may be performed once to select radios and map the active applications to the selected radios. This design may reduce processing overhead for mapping applications to radios.

In another design, some or all of the steps (e.g., steps 2 to 7) in FIG. 8B may be iterated multiple times (e.g., based on an LMS algorithm or some other adaptive algorithm) to meet application requirements and/or to obtain better performance. For the first iteration, coexistence manager 260 may initially select and/or adjust radios based on the application requirements from connection manager 240. Connection manager 240 may then map the active applications to the selected radios based on the selected radios and their capabilities. For the second iteration, coexistence manager 260 may select and/or adjust the operation (e.g., the operating states) of radios based on the current mapping of applications to radios and possibly other information such as updated application requirements from connection manager 240, power consumption of wireless device 110, etc. Connection manager 240 may map the active applications to the selected radios and may possibly modify application requirements based on the selected radios and their capabilities. Each subsequent iteration may be performed in a similar manner. The exchange between connection manager 240 and coexistence manager 260 may result in selection of different radios, selection of different operating states for the radios, modification of the application requirements, etc. Connection manager 240 and/or coexistence manager 260 may take actions to equalize or allocate the available resources to fit the application requirements or to modify them if needed. Connection manager 240 and coexistence manager 260 may perform multiple iterations such that the application requirements can be met as best as possible with as little impact to interference between the radios as possible.

The requirements of an application may be modified in various manners. For example, the requirements may be modified by changing the amount of coded information to send for the application by changing a code rate. Changing the code rate may be performed to reduce a transmission bandwidth requirement if a radio cannot meet the nominal requirements of the application. Changing the code rate may impact reliability of data transmission and may result in more retransmissions. In effect, connection manager 240 may serve as a proxy between application source coding and one or more radios. Other characteristics of an application (besides code rate) may also be varied to modify the requirements of the application.

FIGS. 8A and 8B show exemplary designs of uni-directional and bi-directional CxM/CnM interactions, which may also be implemented in other manners. In one design, connection manager 240 may initiate gathering of performance metrics from coexistence manager 260, e.g., via throughput probes or interference measurements. In another design, coexistence manager 260 may provide interference information (e.g., a color chart), channel information, measured radio performance (e.g., throughput estimates), and/or other information to connection manager 240. Connection manager 240 may compute performance metrics based on the information received from coexistence manager 260 and may map applications to radios based on the requirements of the applications, the performance metrics computed by connection manager 240, etc. In yet another design, coexistence manager 260 may determine the mapping of applications to radios based on application requirements received from connection manager 240 and performance metrics determined by coexistence manager 260.

Figure 9A:
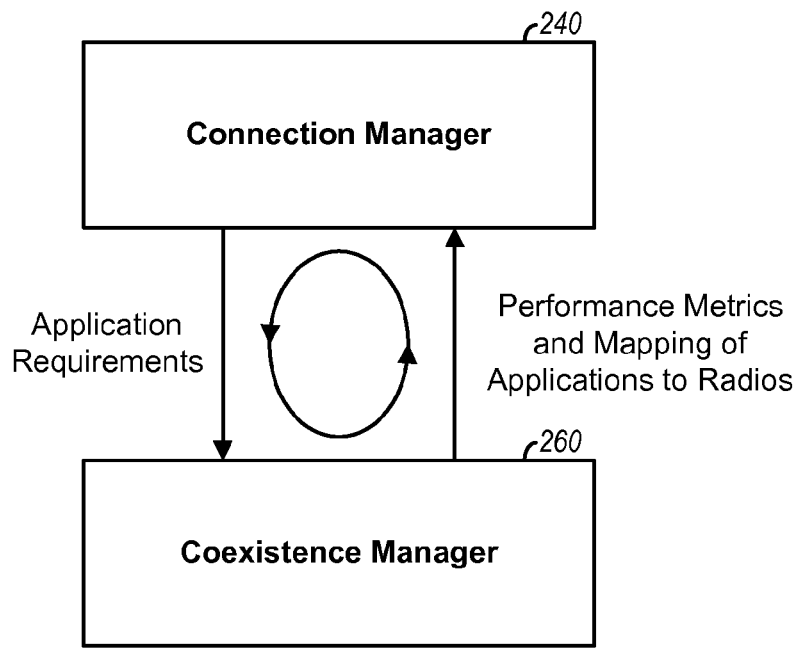
FIGS. 9A and 9B show two designs of iterative bi-directional interaction between the connection manager and the coexistence manager

FIG. 9A shows a design of iterative bi-directional CxM/CnM interaction. In this design, connection manager 240 may initially provide application requirements to coexistence manager 260. Coexistence manager 260 may determine performance metrics of radios and may also determine a mapping of applications to radios based on the application requirements and the performance metrics. Connection manager 240 may receive the mapping from coexistence manager 260 and may map applications to radios based on the mapping. Multiple iterations may be performed to refine the selection of radios and the mapping of applications to radios to improve performance.

Figure 9B:
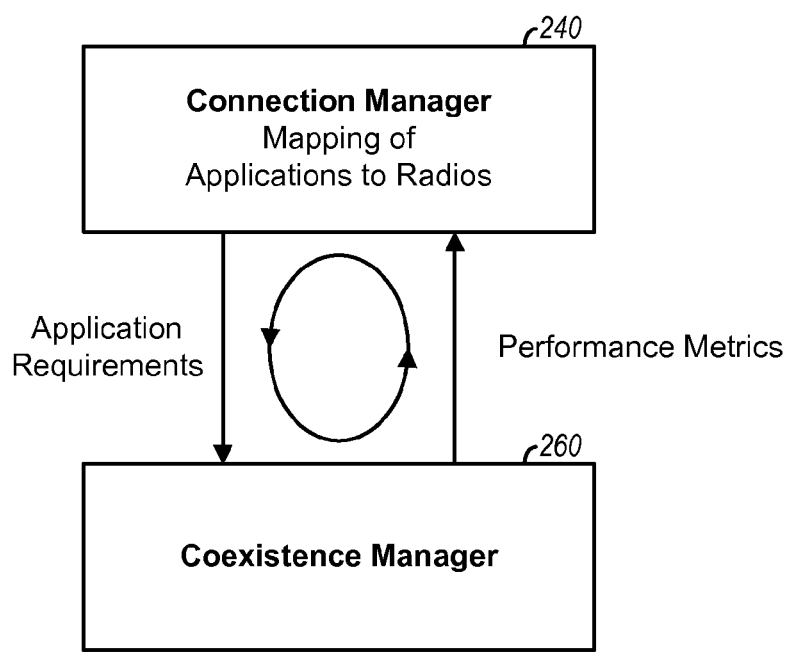

FIG. 9B shows another design of iterative bi-directional CxM/CnM interaction. In this design, connection manager 240 may provide an initial mapping of applications to radios to coexistence manager 260. The initial mapping may be based on (i) preferred radios for the active applications, or (ii) radios selected by coexistence manager 260 without any inputs from connection manager 240, or (iii) radios determined in other manners. Coexistence manager 260 may determine performance metrics of radios based on the initial application-to-radio mapping. Connection manager 240 may receive the performance metrics from coexistence manager 260 and may update the mapping of applications to radios based on the performance metrics and the application requirements. Multiple iterations may be performed to refine the selection of radios and the mapping of applications to radios to improve performance.

FIGS. 9A and 9B show two designs of iterative bi-directional CxM/CnM interaction. Bi-directional CxM/CnM interaction may also be performed iteratively in other manners. Performance metrics of radios may be determined by coexistence manager 260. The mapping of applications to radios may be determined by connection manager 240 and/or coexistence manager 260.

Figure 10:
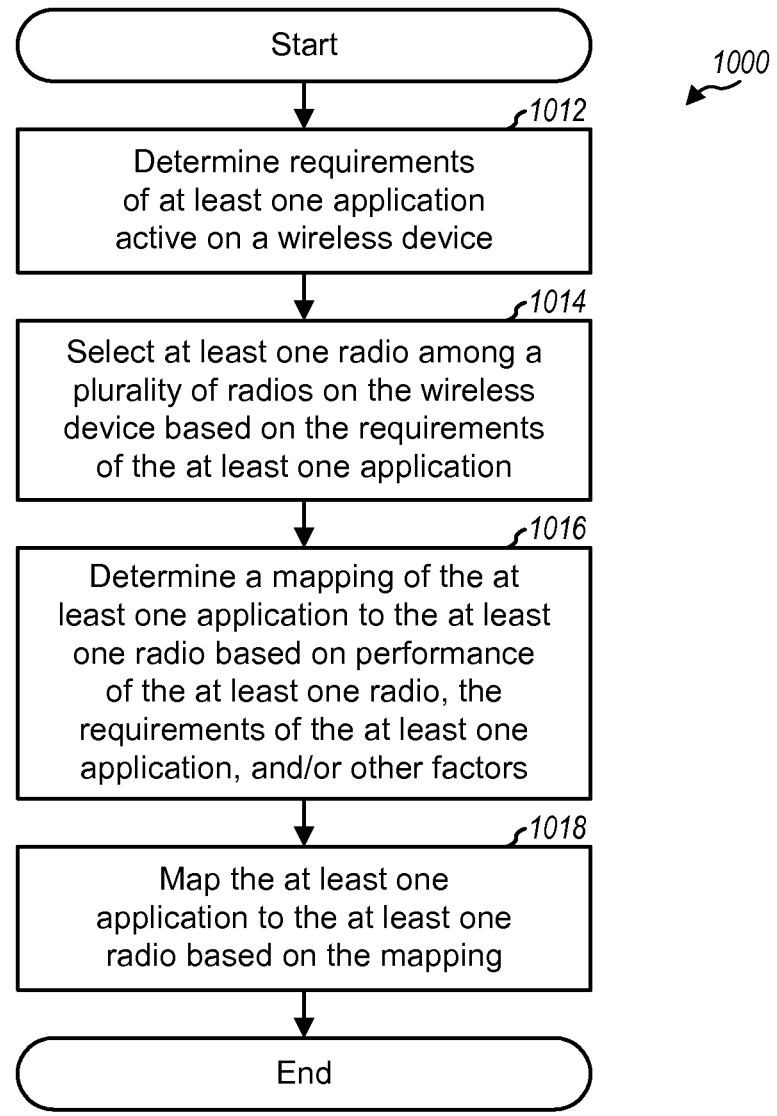
FIG. 10 shows a process for performing system selection based on application requirements.

FIG. 10 shows a design of a process 1000 for performing system selection based on application requirements. Process 1000 may be performed by a wireless device (as described below) or by some other entity. The wireless device may determine requirements of at least one application active on the wireless device (block 1012). The requirements of the at least one application may be related to throughput, latency, jitter, connection time, call drop rate, etc. The wireless device may select at least one radio from among a plurality of radios on the wireless device based on the requirements of the at least one application (block 1014). The wireless device may also select the at least one radio based further on radio preferences for the at least one application, priorities of the radios, performance or capabilities of the radios, interference between the radios, and/or other factors.

The wireless device may determine a mapping of the at least one application to the at least one radio based on the performance of the at least one radio, the requirements of the at least one application, and/or other factors (block 1016). The performance of the at least one radio and the requirements of the at least one application may be related to throughput, delay, jitter, etc. The wireless device may map the at least one application to the at least one radio based on the mapping (block 1018). The wireless device may iteratively select at least one radio and determine the mapping for a plurality of iterations to improve performance.

The wireless device may determine the performance of the at least one radio based on at least one metric related to interference between radios. For example, the performance of the at least one radio may be given by throughput. The wireless device may obtain measurements related to interference between radios and may compute the throughput of each radio based on the measurements related to interference. The wireless device may also directly measure the throughput of each radio, etc.

In one design, the wireless device may set the operating state of each of the at least one radio based on the requirements of the at least one application and/or the interference between radios. In one design, the wireless device may modify the requirements of the at least one application based on the performance of the at least one radio.

In one design, for 1:N mapping, the wireless device may determine the requirements of a single application, select multiple radios based on the requirements of the application, and map different fractions of the application to the multiple radios, one fraction of the application to each of the multiple radios. In one design, for M:1 mapping, the wireless device may determine the requirements of multiple applications, select a single radio based on the requirements of the applications, and map fractions of the multiple applications to the radio, one fraction of each application to the radio. In one design, for M:N mapping, the wireless device may determine the requirements of multiple applications, select multiple radios based on the requirements of the applications, and map fractions of the multiple applications to the multiple radios, one fraction of each application to each of the multiple radios.

In one design, blocks 1012, 1016 and 1018 may be performed by a connection manager, and block 1014 may be performed by a coexistence manager on the wireless device. In another design, block 1012 may be performed by the connection manager, and blocks 1014, 1016 and 1018 may be performed by the coexistence manager. In general, blocks 1012 to 1018 may be performed by one or more entities within the wireless device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining requirements of at least one application active on a wireless device;
   selecting at least one radio to be mapped to the at least one application from among a plurality of radios on the wireless device based on the requirements of the at least one application and based on interference between the plurality of radios;
   mapping the at least one application to the at least one radio; and
   processing multiple communications, during a period of application activity, from the at least one application over the at least one radio in response to the mapping.

2. The method of claim 1, wherein the mapping comprises determining a mapping of the at least one application to the at least one radio based on performance of the at least one radio and the requirements of the at least one application, and
   mapping the at least one application to the at least one radio based on the determined mapping of the at least one application to the at least one radio.

3. The method of claim 2, further comprising:
   determining the performance of the at least one radio based on at least one metric related to interference between the plurality of radios, or channel conditions, or throughput, or a combination thereof.

4. The method of claim 2, wherein the performance of the at least one radio is given by throughput, the method further comprising:
   obtaining measurements related to interference between the plurality of radios, or channel conditions, or both; and
   computing throughput of each of the at least one radio based on the measurements.

5. The method of claim 2, wherein the performance of the at least one radio and the requirements of the at least one application are related to throughput, or delay, or jitter, or a combination thereof.

6. The method of claim 2, further comprising:
   performing the selecting at least one radio and the determining the mapping for a plurality of iterations.

7. The method of claim 2, wherein the requirements of the at least one application are related to throughput, latency, jitter, connection time, call drop rate, or a combination thereof.

8. The method of claim 1, further comprising:
determining performance of the at least one radio; and
modifying the requirements of the at least one application based on the performance of the at least one radio.

9. The method of claim 1, wherein the selecting at least one radio comprises selecting the at least one radio based further on radio preferences for the at least one application, or priorities of the plurality of radios, or performance of the plurality of radios, or channel conditions, or throughput, or a combination thereof.

10. The method of claim 1, further comprising:
setting an operating state of each of the at least one radio based on the requirements of the at least one application, or interference between the plurality of radios, or channel conditions, or throughput, or a combination thereof.

11. The method of claim 1, wherein the determining comprises determining requirements of a single application, wherein the selecting comprises selecting multiple radios based on the requirements of the single application, and wherein the mapping comprises mapping different fractions of the single application to the multiple radios, one fraction of the single application to each of the multiple radios.

12. The method of claim 1, wherein the determining comprises determining requirements of multiple applications, wherein the selecting comprises selecting a single radio based on the requirements of the multiple applications, and wherein the mapping comprises mapping fractions of the multiple applications to the single radio, one fraction of each of the multiple applications to the single radio.

13. The method of claim 1, wherein the determining comprises determining requirements of multiple applications, wherein the selecting comprises selecting multiple radios based on the requirements of the multiple applications, and wherein the mapping comprises mapping fractions of the multiple applications to the multiple radios.

14. The method of claim 1, wherein the determining and the mapping are performed by a connection manager and the selecting is performed by a coexistence manager on the wireless device.

15. The method of claim 1, wherein the determining is performed by a connection manager and the selecting and the mapping are performed by a coexistence manager on the wireless device.

16. An apparatus for wireless communication, comprising:
means for determining requirements of at least one application active on a wireless device;
means for selecting at least one radio to be mapped to the at least one application from among a plurality of radios on the wireless device based on the requirements of the at least one application and based on interference between the plurality of radios;
means for mapping the at least one application to the at least one radio; and
means for processing multiple communications, during a period of application activity, from the at least one application over the at least one radio in response to the mapping.

17. The apparatus of claim 16, wherein the means for mapping comprises means for determining a mapping of the at least one application to the at least one radio based on performance of the at least one radio and the requirements of the at least one application, and means for mapping the at least one application to the at least one radio based on the determined mapping of the at least one application to the at least one radio.

18. The apparatus of claim 17, further comprising:
means for performing the selecting at least one radio and the determining the mapping for a plurality of iterations.

19. The apparatus of claim 16, further comprising:
means for determining performance of the at least one radio; and
means for modifying the requirements of the at least one application based on the performance of the at least one radio.

20. The apparatus of claim 16, wherein the means for selecting at least one radio comprises means for selecting the at least one radio based on performance of the plurality of radios, or channel conditions, or throughput, or a combination thereof.

21. The apparatus of claim 16, further comprising:
means for setting an operating state of each of the at least one radio based on the requirements of the at least one application, or interference between the plurality of radios, or channel conditions, or throughput, or a combination thereof.

22. An apparatus for wireless communication, comprising:
at least one processor configured:
to determine requirements of at least one application active on a wireless device,
to select at least one radio to be mapped to the at least one application from among a plurality of radios on the wireless device based on the requirements of the at least one application and based on interference between the plurality of radios,
to map the at least one application to the at least one radio, and
to process multiple communications, during a period of application activity, from the at least one application over the at least one radio in response to the mapping.

23. The apparatus of claim 22, wherein the at least one processor is configured to determine a mapping of the at least one application to the at least one radio based on performance of the at least one radio and the requirements of the at least one application, and to map the at least one application to the at least one radio based on the determined mapping of the at least one application to the at least one radio.

24. The apparatus of claim 23, wherein the at least one processor is configured to perform the selecting at least one radio and the determining the mapping for a plurality of iterations.

25. The apparatus of claim 22, wherein the at least one processor is configured to determine performance of the at least one radio, and to modify the requirements of the at least one application based on the performance of the at least one radio.

26. The apparatus of claim 22, wherein the at least one processor is configured to select the at least one radio based on performance of the plurality of radios, or interference between the plurality of radios, or channel conditions, or throughput, or a combination thereof.

27. The apparatus of claim 22, wherein the at least one processor is configured to set an operating state of each of the at least one radio based on the requirements of the at least one application, or interference between the plurality of radios, or channel conditions, or throughput, or a combination thereof.

28. A computer program product, comprising:
a non-transitory computer-readable medium comprising:
code for causing at least one computer to determine requirements of at least one application active on a wireless device,
code for causing the at least one computer to select at least one radio to be mapped to the at least one application from among a plurality of radios on the wireless device based on the requirements of the at least one application and based on interference between the plurality of radios, code for causing the at least one computer to map the at least one application to the at least one radio; and code for processing multiple communications, during a period of application activity, from the at least one application over the at least one radio in response to the mapping.

* * * * *